(12) United States Patent
Ben-Michael et al.

(10) Patent No.: US 9,280,504 B2
(45) Date of Patent: Mar. 8, 2016

(54) METHODS AND APPARATUS FOR SHARING A NETWORK INTERFACE CONTROLLER

(75) Inventors: Simoni Ben-Michael, Givat Zeev (IL); Eliel Louzoun, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 13/593,591

(22) Filed: Aug. 24, 2012

(65) Prior Publication Data

US 2014/0059266 A1 Feb. 27, 2014

(51) Int. Cl.
*G06F 13/14* (2006.01)
*G06F 13/38* (2006.01)

(52) U.S. Cl.
CPC .............. *G06F 13/385* (2013.01); *G06F 13/14* (2013.01)

(58) Field of Classification Search
CPC ......... G06F 13/14; G06F 13/36; G06F 13/30; G06F 13/00
See application file for complete search history.

(56) References Cited

U.S. PATENT DOCUMENTS

| | | | |
|---|---|---|---|
| 7,305,047 B1 * | 12/2007 | Turner ........................... | 375/316 |
| 7,539,129 B2 * | 5/2009 | Nishino ......................... | 370/216 |
| 7,934,032 B1 * | 4/2011 | Sardella et al. ............... | 710/104 |
| 2002/0181194 A1 | 12/2002 | Ho et al. | |
| 2004/0268015 A1 * | 12/2004 | Pettey et al. .................. | 710/313 |
| 2005/0053060 A1 | 3/2005 | Pettey | |
| 2006/0112210 A1 * | 5/2006 | Tseng ............................ | 710/307 |
| 2006/0187954 A1 * | 8/2006 | Braschi et al. ................ | 370/463 |
| 2008/0295098 A1 | 11/2008 | Cardona et al. | |
| 2009/0164684 A1 * | 6/2009 | Atherton et al. .............. | 710/300 |
| 2010/0101759 A1 | 4/2010 | Campbell et al. | |
| 2011/0202701 A1 | 8/2011 | Maitra | |
| 2011/0213863 A1 * | 9/2011 | Shah et al. .................... | 709/220 |
| 2012/0039165 A1 * | 2/2012 | Brown et al. ................. | 370/220 |
| 2012/0177035 A1 * | 7/2012 | Sharma et al. ............... | 370/355 |
| 2013/0145072 A1 * | 6/2013 | Venkataraghavan et al. . | 710/316 |
| 2013/0346665 A1 * | 12/2013 | Freking et al. ............... | 710/313 |

FOREIGN PATENT DOCUMENTS

WO 2014/031230 A1 2/2014

OTHER PUBLICATIONS

International Search Report and Written Opinion received for PCT Patent Application No. PCT/US2013/047788, mailed on Oct. 22, 2013, 15 pages.
International Preliminary Report on Patentability and Written Opinion received for PCT Patent Application No. PCT/US2013/047788, mailed on Mar. 5, 2015, 10 pages.

* cited by examiner

*Primary Examiner* — Khanh Dang
(74) *Attorney, Agent, or Firm* — Law Office of R. Alan Burnett, P.S.

(57) ABSTRACT

Methods, apparatus, and systems for enhancing communication between compute resources and networks in a microserver environment. Micro-server modules configured to be installed in a server chassis include a plurality of processor subsystems coupled in communication to a shared Network Interface Controller (NIC) via PCIe links. The shared NIC includes at least one Ethernet port and a PCIe block including a shared PCIe interface having a first number of lanes. The PCIe lines between the processor sub-systems and the shared PCIe interface employ a number of lanes that is less than the first number of lanes, and during operation of the microserver module, the shared NIC is configured to enable each processor sub-system to access the at least one Ethernet port using the PCIe link between that processor sub-system and the shared PCIe block on the shared NIC.

26 Claims, 11 Drawing Sheets

METHODS AND APPARATUS FOR SHARING A NETWORK INTERFACE CONTROLLER

FIELD OF THE INVENTION

The field of invention relates generally to computer systems and, more specifically but not exclusively relates to techniques for enhancing communication between compute resources and networks in a micro-server environment.

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly four decades. At the same time, the size of both memory and non-volatile storage has also steadily increased, such that many of today's servers are more powerful than supercomputers from just 10-15 years ago. In addition, the speed of network communications has likewise seen astronomical increases.

Increases in processor speeds, memory, storage, and network bandwidth technologies have lead to the build-out and deployment of networks and on-line resources with substantial processing and storage capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure in addition to the deployment of massive data centers to support these services through use of private network infrastructure.

A common data center deployment includes a large number of server racks, each housing multiple rack-mounted servers or blade server chassis. Communications between the rack-mounted servers is typically facilitated using the Ethernet (IEEE 802.3) protocol over wire cable connections. In addition to the option of using wire cables, blade servers may be configured to support communication between blades in a blade server rack or chassis over an electrical backplane or mid-plane interconnect. In addition to these server configurations, recent architectures include use of arrays of processors to support massively parallel computations, as well as aggregation of many small "micro-servers" to create compute clusters within a single chassis or rack.

Various approaches have been used to support connectivity between computing resources in high-density server/cluster environments. For example, under a common approach, each server includes a network port that is connected to an external central switch using a wire cable Ethernet link. This solution requires a lot of external connections and requires a network interface controller (NIC) for each micro-server CPU (central processing unit, also referred to herein as a processor). This also increases the latency of traffic within the local CPUs compared with others approaches. As use herein, a NIC comprises a component configured to support communications over a computer network, and includes a Physical (PHY) interface and support for facilitating Media Access Control (MAC) layer functionality.

One approach as applied to blade servers is shown in FIG. 1a. Each of a plurality of server blades 100 is coupled to a backplane 102 via mating board connectors 104 and backplane connectors 106. Similarly, each of Ethernet switch blades 108 and 110 is coupled to backplane 102 via mating connectors 112. In this example, each server blade includes a pair of CPUs 114a and 114b coupled to respective memories 116a and 116b. Each CPU also has its own PCIe Root Complex (RC) and NIC, as depicted by PCIe RCs 118a and 118b and NICs 120a and 120b. Meanwhile, each Ethernet switch blade includes an Ethernet switch logic block 122 comprising logic and circuitry for supporting an Ethernet switch function that is coupled to a plurality of Ethernet ports 124 and connector pins on connector 112.

During operation, Ethernet signals are transmitted from NICs 120a and 120b of the plurality of server blades 100 via wiring in backplane 102 to Ethernet switch blades 108 and 110, which perform both an Ethernet switching function for communication between CPUs within the blade server and facilitate Ethernet links to external networks and/or other blade servers. NICs 120a and 120b are further configured to receive switched Ethernet traffic from Ethernet switch blades 108 and 110.

FIG. 1b shows an augmentation to the approach of FIG. 1a under which PCIe signals are sent over wiring in backplane 102 rather than Ethernet signals. Under this configuration, each of a plurality of server blades 130 includes one or more CPUs 132 coupled to memory 134. The CPU(s) 132 are coupled to a PCIe Root Complex 136, which includes one or more Root Ports (not shown) coupled to connector pins in a connector 138. Meanwhile, each of Ethernet switch blades 140 and 142 includes an Ethernet switch logic block 144 coupled to a plurality of Ethernet ports 146 and a PCIe switch logic block 148 coupled to connector pins on a connector 150.

Another approach incorporates a fabric with the local micro-server CPUs by providing dedicated connections between the local micro-server CPUs and uplinks from each micro-server CPU to a central switch. This solves the latency problem, but requires inter micro-server CPU connectivity and a large number of uplinks. This approach may be augmented by providing dedicated connections between the CPUs and providing uplinks only from some servers, while other servers access the network through the fabric. This solves the connectivity problem but increases latency. Both solutions using a fabric also require a dedicated protocol or packet encapsulation to control the traffic within the fabric.

To address some communication aspects of virtualization on server blades, PCI-SIG® (Peripheral Component Interconnect—Special Interest Group) created the Multi-Root I/O Virtualization (MR-IOV) specification, which defines extensions to the PCI Express (PCIe) specification suite to share PCI hardware resources across blades. Under the MR-IOV approach, a NIC is configured to share its network interface among different virtual machines (VMs) running on host processors, requiring use of one or more additional MR-IOV switches capable of connecting to different data planes.

Yet another approach is to employ distributed switching. Under distributed switching, micro-server CPU's are connected to each other with interconnect links (such as via a ring, torus, 3-D torus etc., topology), with a few uplinks within the topology for reaching an external network. Distributed switching solves some connectivity issues common to star topologies, but adds significant latency to the data transfer. Additionally, data transmissions often require blocks of data to be sent along a path with many hops (i.e., through adjacent micro-server CPUs using a ring or torus topology), resulting in substantial waste of power.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 6a, 6b, and 6c illustrate exemplary micro-server processor sub-system to shared PCIe interface configurations, wherein FIG. 6a depicts a configuration employing four SoCs using four PCIe ×1 links, FIG. 6b depicts a configuration employing four SoCs using four PCIe ×2 links, and FIG. 6c depicts a configuration employing eight SoCs using eight PCIe ×1 links;

DETAILED DESCRIPTION

Embodiments of methods, apparatus, and systems for enhancing communication between compute resources and networks in a micro-server environment. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the following embodiments, a shared Ethernet NIC scheme is disclosed that facilitates communication between micro-servers using independent PCIe uplinks, each composed from one or more PCIe lanes.

Each micro-server is exposed to at least one PCIe function that can access one or more of the NIC's ports. In one embodiment, switching between the functions is done within the NIC using a Virtual Ethernet Bridging (VEB) switch. This functionality is facilitated, in part, through a multi-layer interface including one or more abstraction layers that facilitate independent access by each of the micro-servers to the shared NIC functions including Ethernet access.

Figure 1A:
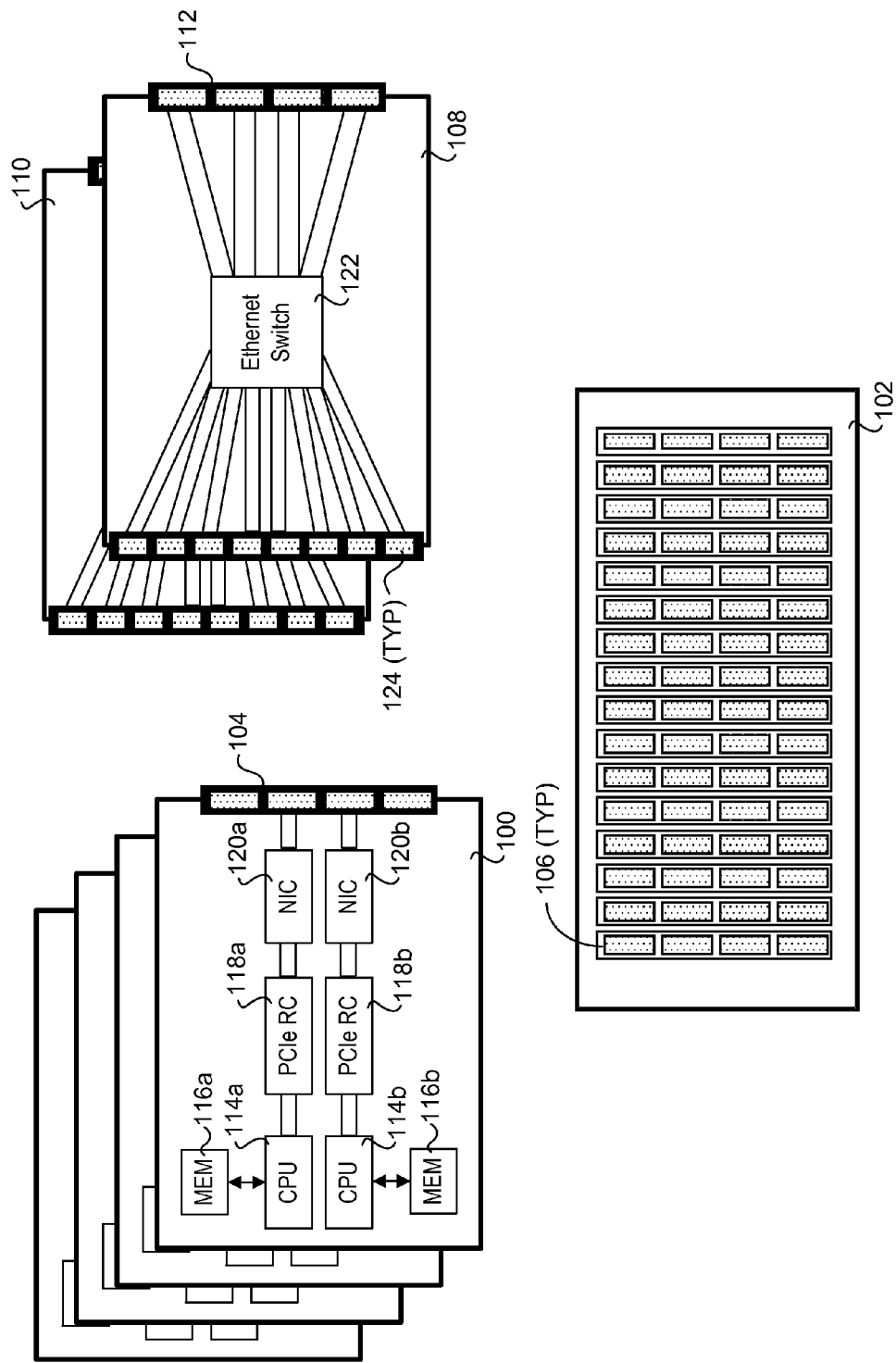
FIGS. 1a and 1b are block diagrams illustrating two conventional approaches for facilitating communication between processors on different blades in a blade server environment employing an internet network.
Figure 1B:
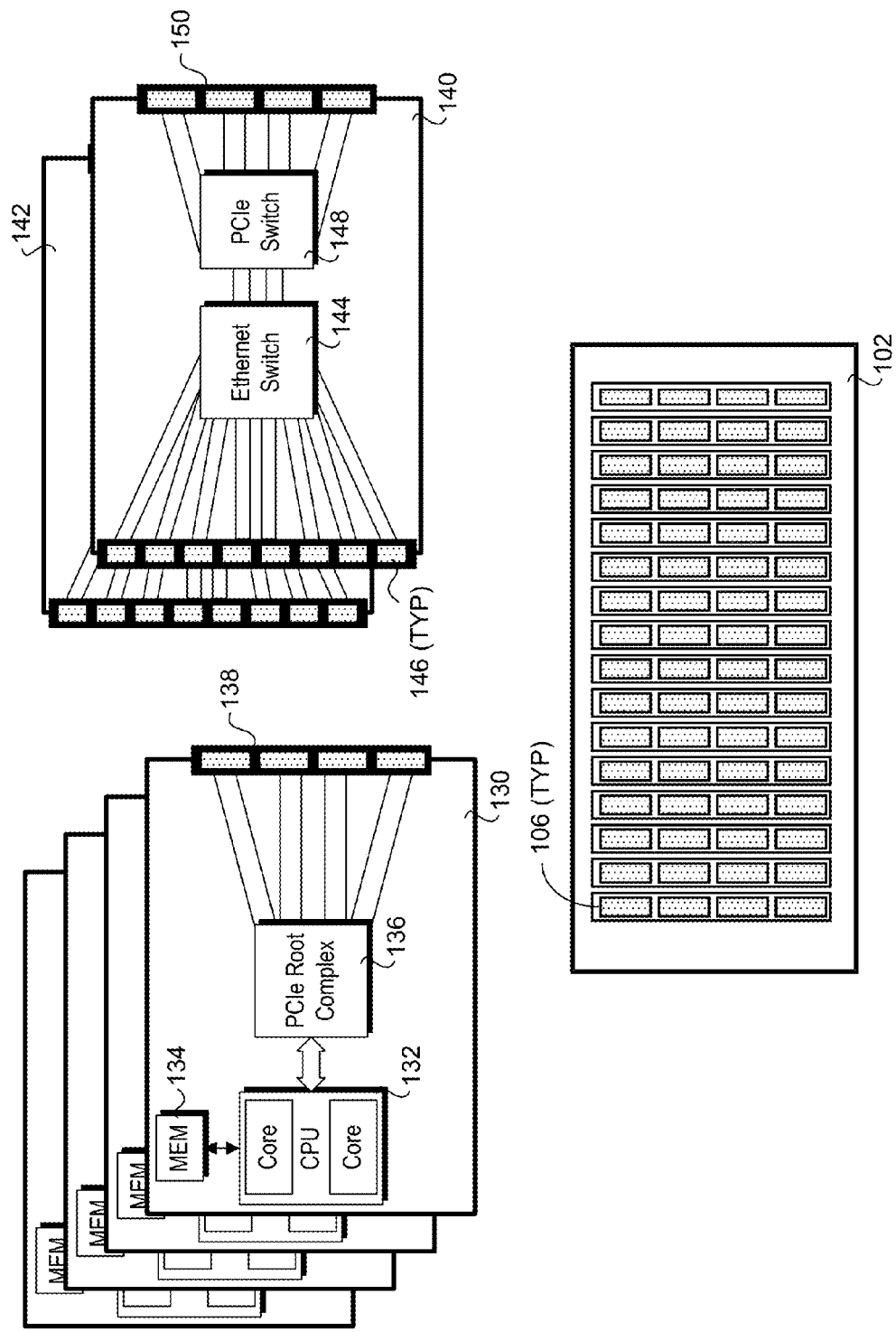
Figure 2:
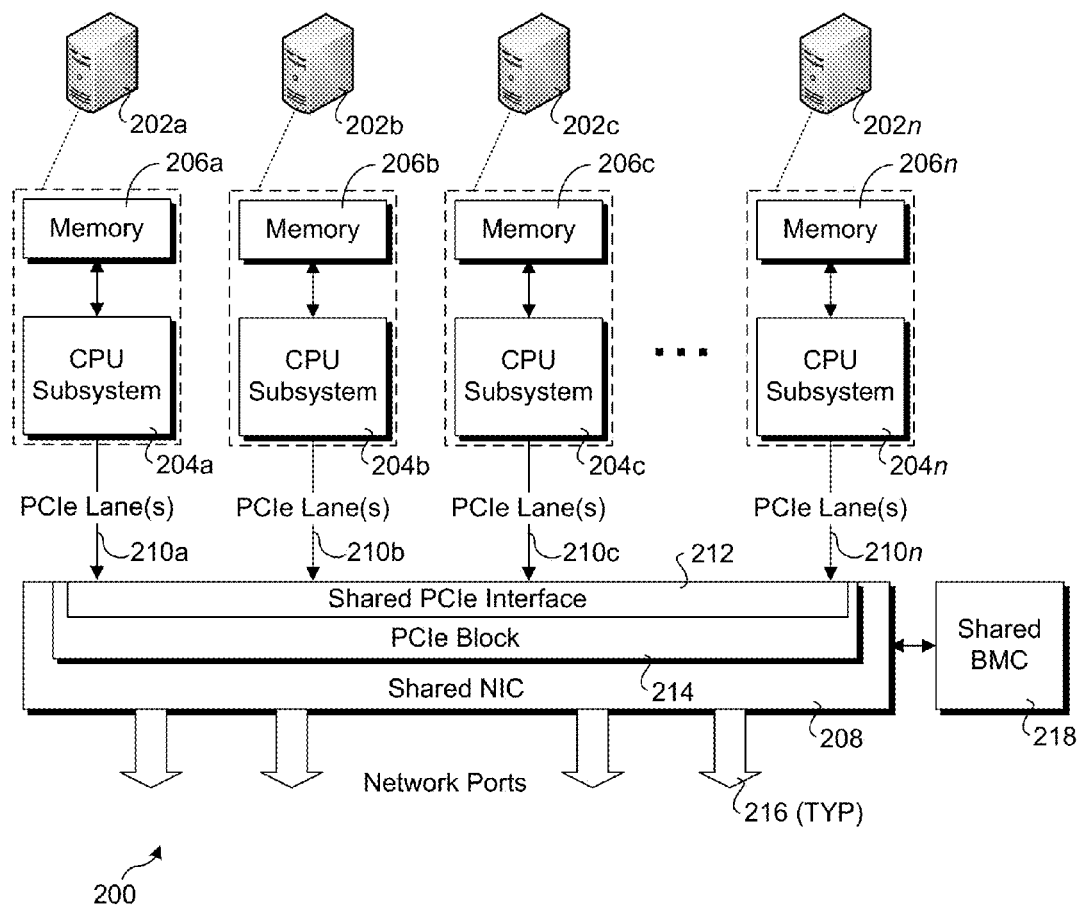
FIG. 2 is a block diagram illustrating an architecture that enables multiple micro-servers to share access to networking facilities provided by a shared NIC, according to one embodiment.

An exemplary micro-server module architecture 200 according to one embodiment is shown in FIG. 2. A plurality of micro-servers 202a-n, each comprising a CPU (or processor) subsystem 204m coupled to a memory 206m, is coupled to a shared NIC 208 via one or more PCIe lanes 210m received at a shared PCIe interface 212 of a PCIe block 214 in the NIC. For example, micro-server 202a comprises a CPU subsystem 204a and a memory 206a, while micro-server 202b comprises a CPU subsystem 204b and memory 206b. Shared NIC 208 is coupled to one or more Ethernet ports 216. In one embodiment, a shared Board Management Controller (BMC) 218 is also coupled to shared NIC 208, and shared NIC 208 includes logic to enable forwarding between each of the micro-servers and BMC 218.

In general, the number of micro-servers n that may be supported by shared NIC 208 is two or greater. In one embodiment employing single PCIe lanes, the maximum value for n may be equal to the PCIe maximum lane width employed for a PCIe connection between a micro-servers 202 and NIC 208, such as n=8 for a single PCIe ×8 interface or n=16 for a PCIe ×16 interface. For example, a NIC with an ×8 (i.e., 8 lane) PCIE Gen 3 ($3^{rd}$ generation) PCIe interface can be divided to support up to 8 single PCIe interfaces, each employing a single lane providing up to 8 Gbps full duplex bandwidth to each micro-server. Of course, when multiple lanes are used for a single link between a micro-server 202 and shared NIC 208, the number of micro-servers that may be supported by a given shared NIC will be reduced. As another option, the assignment of lanes between processors and a shared NIC may be asymmetric (e.g., 2 lanes for one processor, 1 lane for another).

Figure 3:
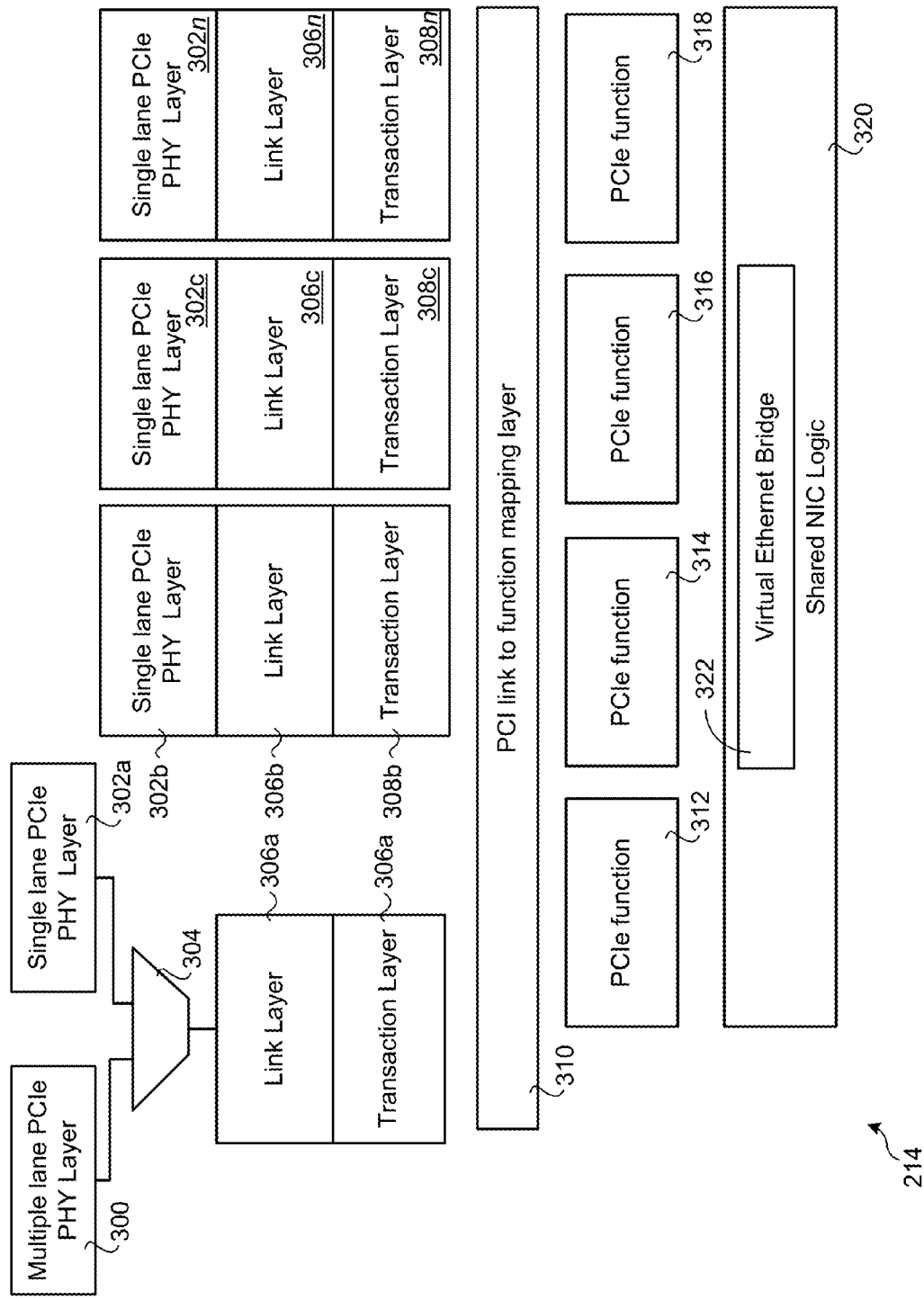
FIG. 3 is a block diagram illustrating details of layers in a multi-layer architecture corresponding to the shared NIC of FIG. 2, according to one embodiment.

FIG. 3 illustrates further details of PCIe block 214, according to one embodiment. The multi-level architecture includes a multiple lane PCIe PHY layer 300, single lane PCIe PHY layers 302a, 302b, 302c and 302n, a multiplexer (mux) 304, link layers 306a, 306b, 306c, and 306n, transaction layers 308a, 308b, 308c and 308n, a PCI link to function mapping layer 310, PCIe functions 312, 314, 316, and 318, and shared NIC logic 320 including a Virtual Ethernet Bridge (VEB) switch 322. Accordingly, the architecture exposes multiple PCIe PHY (Physical), link, and transaction layers to the micro-servers via a respective PCIe link using a single PCIe lane. In order to allow conventional usage of the NIC (i.e., as a dedicated NIC for a single micro-server), mux 304 may be configured to connect signals from multiple lane PCIe PHY layer 300 to link layer 306a, thus facilitating use of a multiple lane PCIe link between a micro-server and the NIC. Moreover, although shown a connection one single lane PCIe PHY layer block, mux circuitry may be configured to support multi-lane PCIe links between one or more micro-servers and the NIC.

PCIe link to function mapping layer 310 operates as an abstraction layer that enables access from any micro-server to any of PCIe functions 312, 314, 316, and 318. Although depicted as four PCIe functions, it will be understood that this is merely one example, as various numbers of PCIe functions may be implemented at the PCIe function layer, and the number of PCIe functions may generally be independent of the number of micro-servers sharing a NIC. In general, a PCIe function may include any function provided by a PCIe device.

Shared NIC logic 320 is configured to enable the PCIe functions to share access to corresponding NIC facilities, such as access to network ports and associated logic (e.g., network layers including an Ethernet PHY layer and buffers) for transmitting and receiving Ethernet traffic. It also includes logic for switching between PCIe functions and NIC functions. In one embodiment, switching between the functions is done within shared NIC logic 320 using VEB switch 322. Under this scheme, the sharing of the NIC resources (such as Ethernet ports and shared BMC 216) may be implemented through the same or similar techniques employed for sharing NIC resources with System Images under the SR-IOV (Single Root-I/O Virtualization) model.

When receiving packets from one of PCIe functions 312, 314, 316, or 318, shared NIC logic 320 will look up the header of the packet and decide if the packet destination is one of the other PCI functions, the network, or both. Shared NIC logic 320 may also be configured to replicate packets to multiple functions for broadcast or multicast received packets, depending on the particular implementation features and designated functions.

According to some aspects, the logic employed by PCIe block 214 is similar to logic employed in virtualized systems to support virtual machine (VM) to VM switching within a single server. Under a conventional approach, a server runs a single instance of an operating system directly on physical hardware resources, such as the CPU, RAM, storage devices (e.g., hard disk), network controllers, I/O ports, etc. Under a virtualized approach, the physical hardware resources are apportioned to support corresponding virtual resources, such that multiple System Images (SIs) may run on the server's physical hardware resources, wherein each SI includes its own CPU allocation, memory allocation, storage devices, network controllers, I/O ports etc. Moreover, through use of a virtual machine manager (VMM) or "hypervisor," the virtual resources can be dynamically allocated while the server is running, enabling VM instances to be added, shut down, or repurposed without requiring the server to be shut down.

In view of the foregoing, the micro-server systems described herein may be configured to implement a virtualized environment hosting SIs on VMs running on micro-server CPUs. For example, a given micro-server depicted in the figures herein may be employed to host a single operating system instance, or may be configured to host multiple SIs through use of applicable virtualization components. Under such implementation environments, the same or similar logic may be used to switch traffic between micro-servers and VMs running on micro-servers within the same system.

This technique is similar in performance to an MR-IOV implementation, but doesn't require an MR-IOV switch or deployment (management) of MR-IOV requiring one of the servers to act as the owner of the MR-IOV programming. The technique provides latency similar to that available with a dedicated NIC (per each micro-server) and employs a single set of uplink ports. Moreover, the technique does not require any special network configuration for the internal fabric and may be used with existing operating systems.

Figure 4:
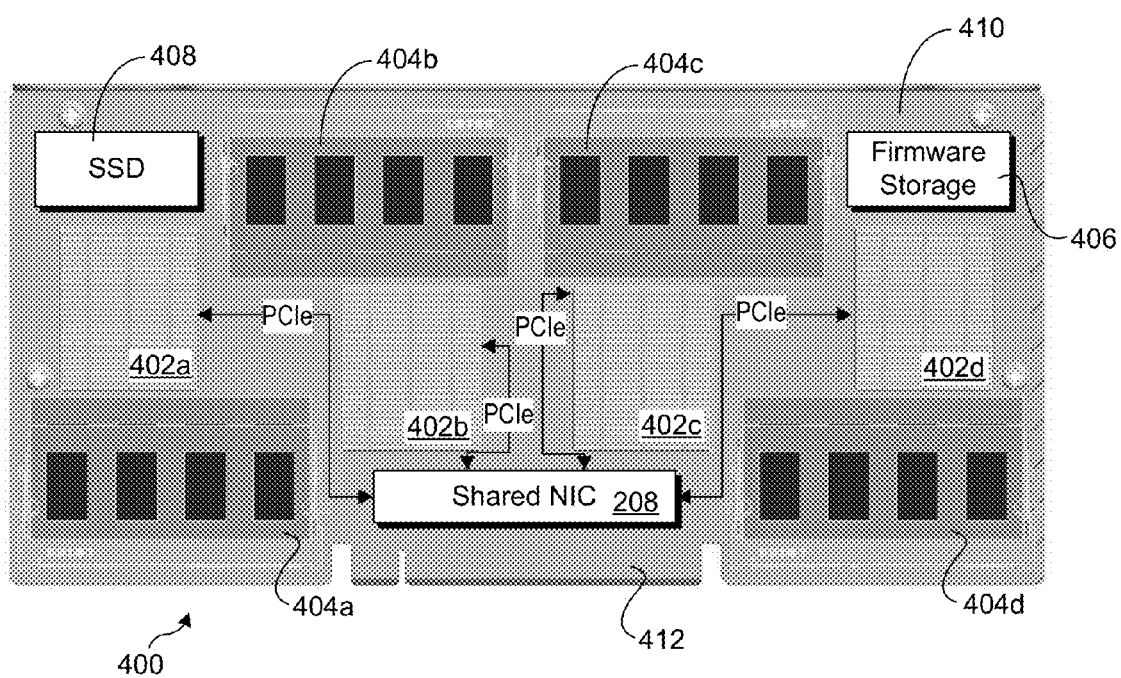
FIG. 4 is a combined schematic and block diagram illustrating one embodiment of a micro-server module employing four micro-servers that share access to a shared NIC.

A micro-system module 400 configured to facilitate an exemplary implementation of the techniques and logic illustrated in the embodiments of FIGS. 2 and 3 is shown in FIG. 4. Micro-system module 400 includes four CPU subsystems comprising Systems on a Chip (SoCs) 402a, 402b, 402c, and 402d, each coupled to respective memories 404a, 404b, 404c, and 404d. Each of SoCs 402a, 402b, 402c, and 402d is also communicatively coupled to shared a NIC 208 via a respective PCIe link. Each of SoCs 402a, 402b, 402c, and 402d also has access to an instruction storage device that contains instructions used to execute on the processing cores of the SoC. Generally, these instructions may include both firmware and software instructions, and may be stored in either single devices for a module, as depicted by a firmware storage device 406 and a Solid State Drive (SSD) 408, or each SoC may have its own local firmware storage device and/or local software storage device. As another option, software instructions may be stored on one or more mass storage modules and accessed via an internal network during module initialization and/or ongoing operations.

Each of the illustrated components are mounted either directly or via an applicable socket or connector to a printed circuit board (PCB) 410 including wiring (e.g., layout traces) facilitating transfer of signals between the components. This wiring includes signal paths for facilitating communication over each of the PCIe links depicted in FIG. 4. PCB 410 also includes wiring for connecting selected components to corresponding pin traces on an edge connector 412. In one embodiment, edge connector 412 comprises a PCIe edge connector, although this is merely illustrative of one type of edge connector configuration and is not to be limiting. In addition to an edge connector, an arrayed pin connector may be used, and the orientation of the connector on the bottom of PCB 410 in FIG. 4 is exemplary, as an edge or arrayed pin connector may be located at the end of the PCB.

Figure 5:
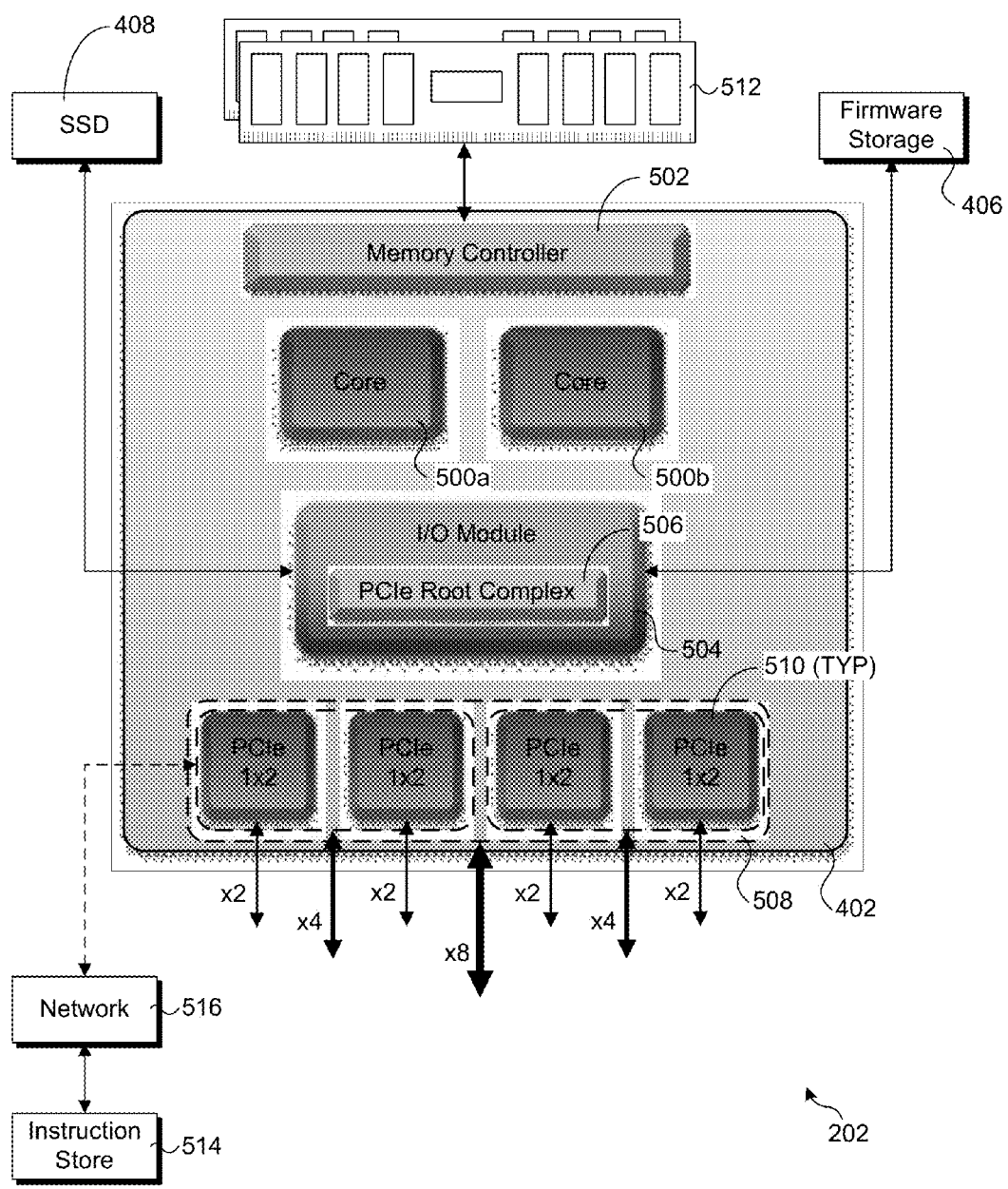
FIG. 5 is a block diagram illustrating details of selected components for a System on a Chip that may be implemented in the processor sub-systems of the micro-server module of FIG. 4.

An exemplary architecture for a micro-server 202 employing an SoC 402 is shown in FIG. 5. SoC 402 is generally representative of various types of processors employing a System on a Chip architecture, such as processors manufactured by Intel® Corporation, Advanced Micro Devices®, Samsung®, IBM®, Sun Microsystems® and others. In one embodiment, SoC 402 comprises an Intel® Atom® processor. SoC 402 generally may also employ various processor instruction set architecture, including x86, IA-32, and ARM-based architectures.

In the illustrated embodiment depicting selected components, SoC 402 includes a pair of processor cores 500a and 500b coupled to a memory controller 502 and to an I/O module 504 including a PCI Root Complex 506. The illustration of two processor cores is merely exemplary, as an SoC may employ one or more processor cores, such as 2, 4, 8, 12, etc. SoC 402 also includes an 8 lane PCIe interface 508 comprising four 1×2 PCIe blocks 510, which may be configured as 8 single lanes, four PCIe ×2 interfaces, two PCIe ×4 interfaces, or a single PCIe ×8 interface. In addition, some embodiments may employ multiple PCI interfaces, including PCIe interfaces with a different number of lanes than PCIe interface 508.

Memory controller 502 is used to provide access to dynamic random access memory (DRAM), configured as one or more memory modules, such as SODIMMs 512 depicted in FIG. 5. I/O module 504 is illustrative of various Input/Output interfaces provided by SoC 402, and includes I/O interfaces for accessing a firmware storage device 406 and an SSD 408. Also depicted is an optional configuration under which instructions for facilitating micro-server processing operations are loaded from an instruction store 514 via a network 516. In some embodiments, various I/O interfaces may be separated out, such as through use of a legacy I/O interface (not shown). Generally, SSD 408 is representative of a housed SSD device, an SSD module, or a block of non-volatile memory including applicable interface circuitry to be operated as a solid state mass storage device or the like. In addition to access to DRAM, a second memory controller may be provided to access SRAM (not shown).

Figure 6A:
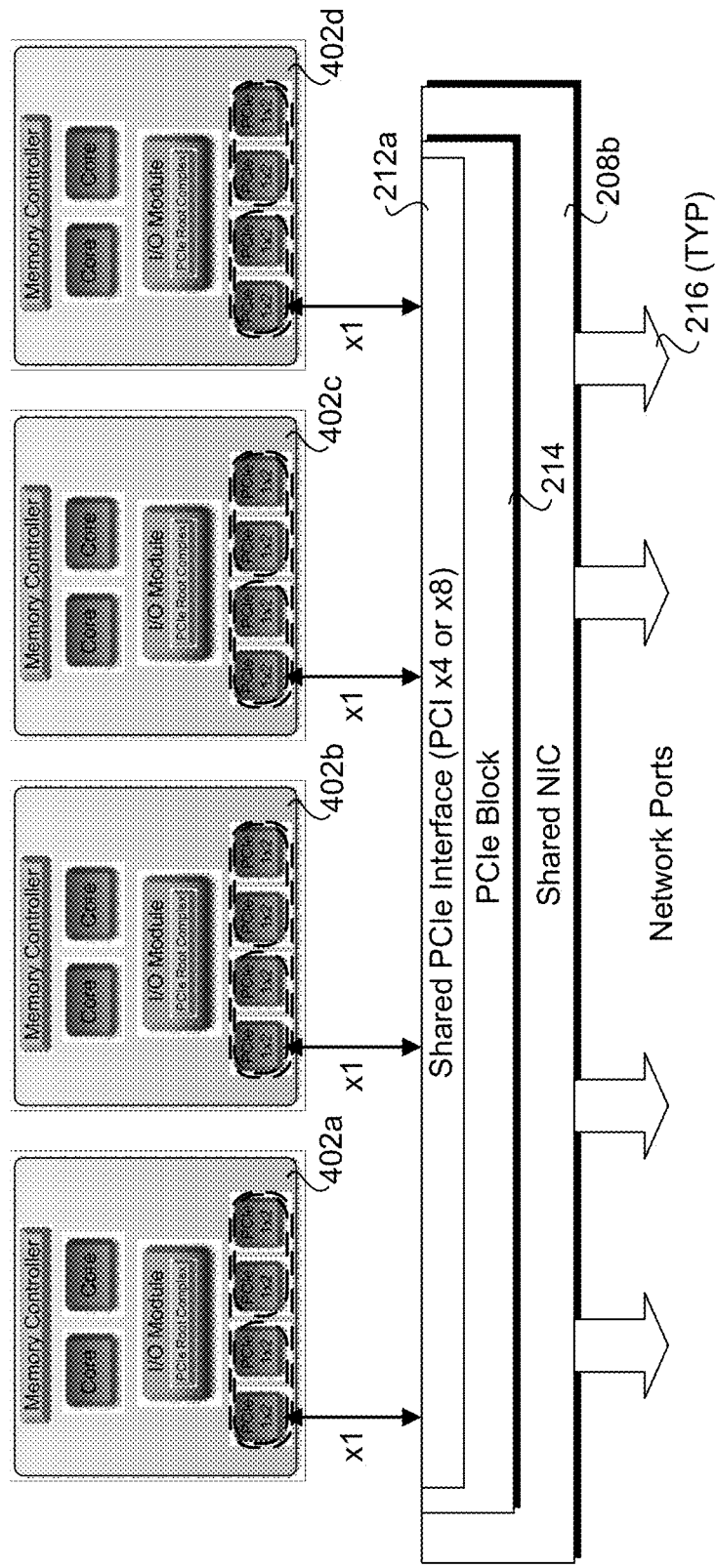
Figure 6B:
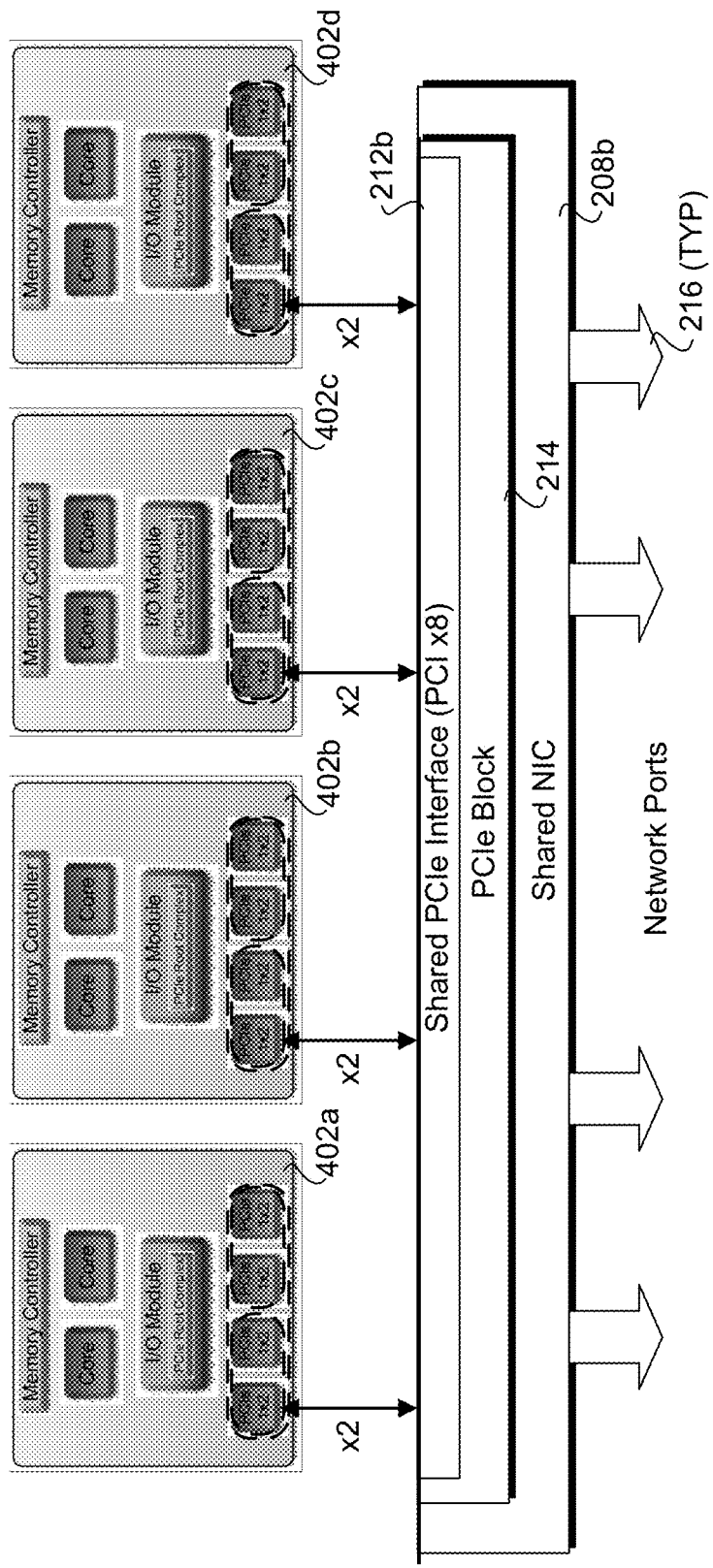
Figure 6C:
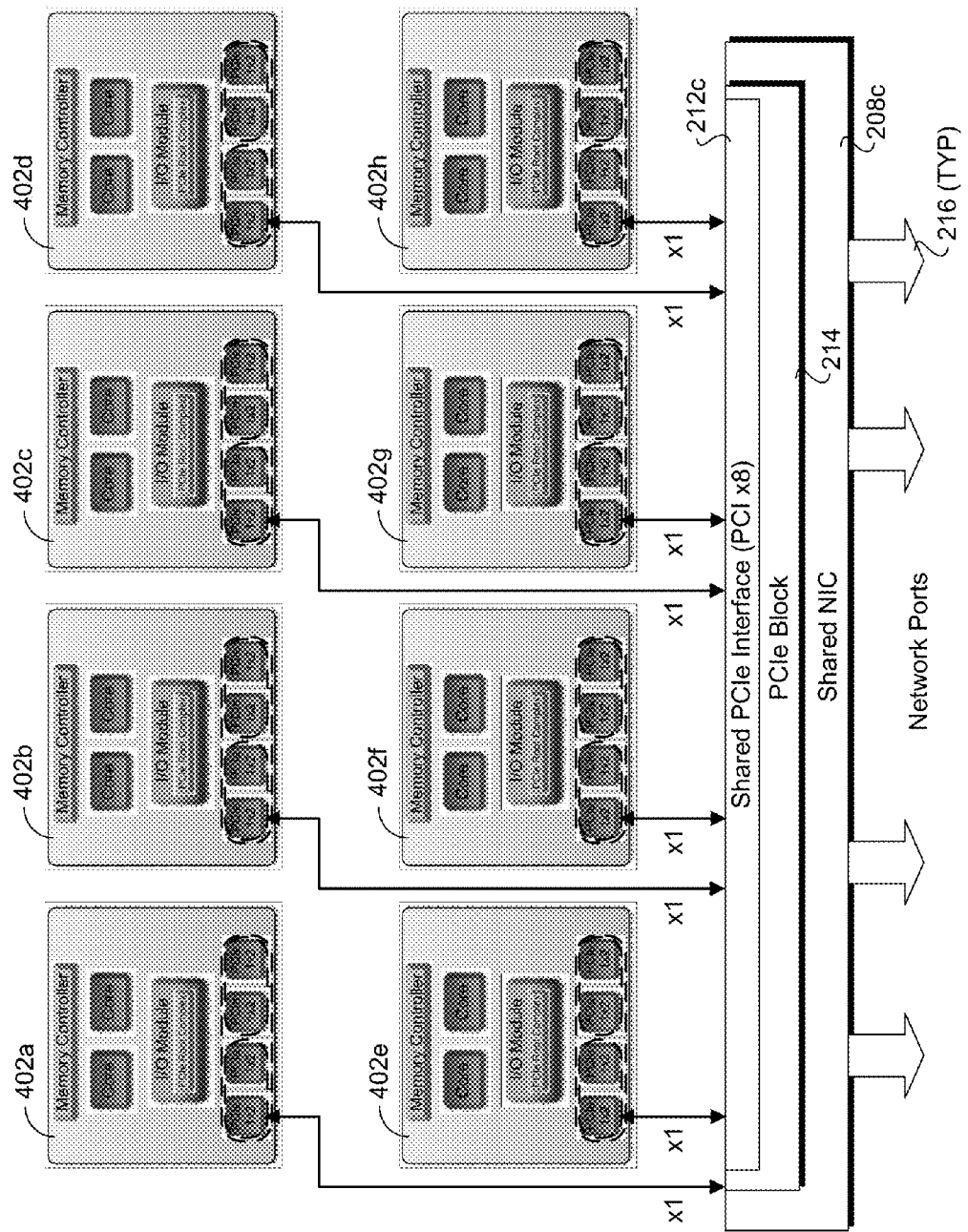

Generally, various combinations of micro-server processor sub-systems and PCIe link widths may be used to implement access to a shared NIC. For instance, three exemplary configurations are shown in FIGS. 6a, 6b, and 6c. In the configuration of FIG. 6a, four processor sub-systems comprising SoC's 402a-d are linked in communication with a shared NIC 208a via four PCIe ×1 (i.e., single-lane PCIe) links that are received by a shared PCIe interface 212a comprising a PCIe ×4 or ×8 interface. In the configuration of FIG. 6b, four processor sub-systems comprising SoC's 402a-d are linked in communication with a shared NIC 208b via four PCIe ×2 (i.e., two-lane PCIe) links that are received by a shared PCIe interface 212a comprising a PCIe ×8 interface. In the configuration of FIG. 6a, eight processor sub-systems comprising SoC's 402a-g are linked in communication with a shared NIC 208c via eight PCIe ×1 links that are received by a shared PCIe 8× interface 212c.

In addition to the embodiments illustrated in FIGS. 6a, 6b, and 6c, other configurations may be implemented in accordance with the following parameters. First, the aggregated widths of the PCIe links between the processor sub-systems (e.g., SoCs) and the shared PCIe interface(s) is less than or equal to the combined lane widths of the shared PCIe interface(s). For example, a shared PCIe interface could comprise a single PCIe ×8 interface or two PCIe ×4 interfaces, each of which has a combined width of 8 lanes. Accordingly, this shared PCIe interface configuration could be shared among up to 8 processor sub-systems employing PCIe ×1 links. There is no requirement that all of the lane widths of the PCIe links between the processor sub-systems and the shared PCIe interface(s) be the same, although this condition may be implemented. Also, the number of processor sub-systems that are enabled to employ a wider multiplexed PCIe link via a mux similar to the scheme shown in FIG. 2 may range from none to all. Moreover, the PCIe link width under a multiplexed configuration may be less than or equal to the lane width of the corresponding shared PCIe interface it connects to. For example, a multiplexed PCIe link of 4× could be received at a shared PCIe interface of 4× or higher. Furthermore, in addition to employing one or more shared PCIe interfaces, a shared NIC may employ one or more dedicated PCIe interfaces (not shown in the embodiments herein).

Figure 7:
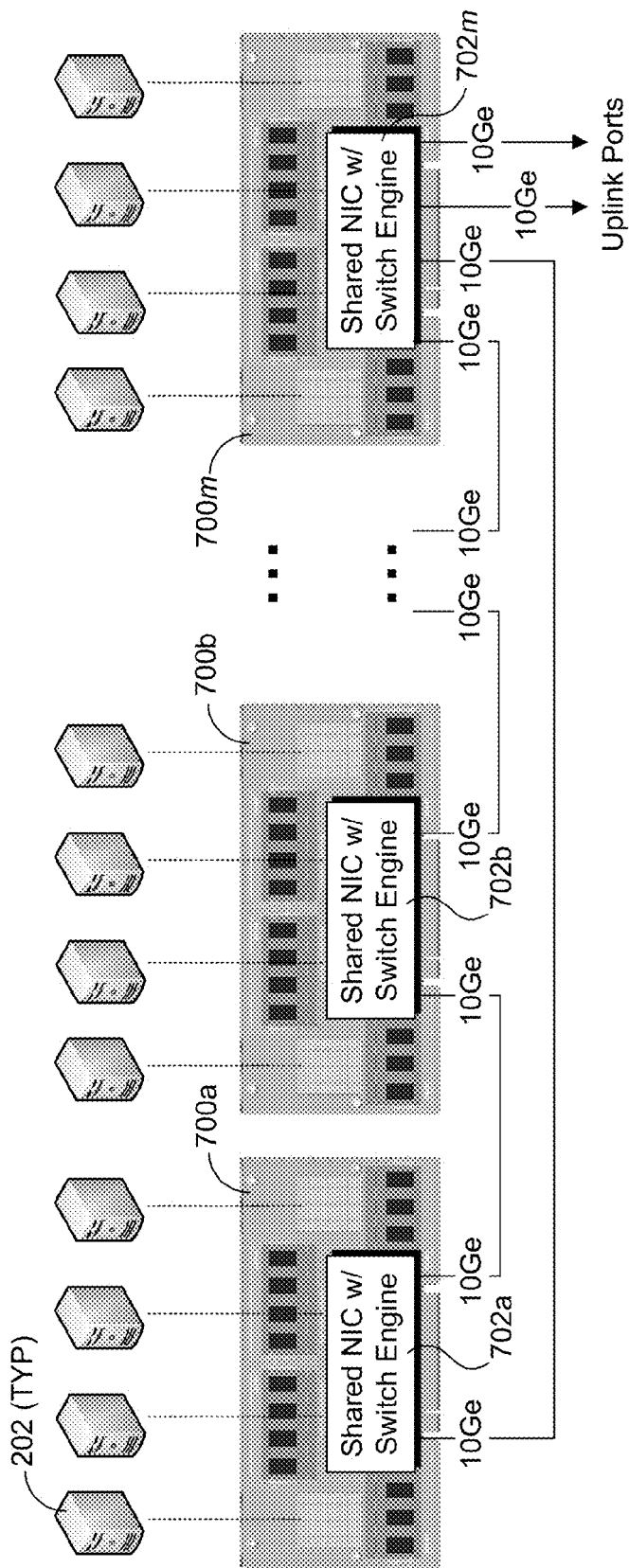
FIG. 7 is a schematic diagram illustrating a system configuration under which multiple micro-server modules are configured to implement a distributed switching scheme using a ring network architecture.

Under some embodiments, a clustered micro-server system may be configured to employ a combination of NIC sharing and distributed switching. For example, the micro-server CPUs on a blade may be configured to share a NIC that is further configured to perform switching operations, such that the NIC/switches may be connected via a ring or a Torus/3-D Torus combination network node configuration. For instance, a clustered system of micro-servers 202 on modules 700a-m configured to implement a ring switching scheme is shown in FIG. 7. Each of modules 700a-m includes a respective shared NIC with switch engine logic block 702a-m. The shared NIC with switch engine block logic employs similar logic to shared NIC 208 for facilitating NIC sharing operation, while further adding switching functionality similar to that implemented by Ethernet switch blocks in ring-type network architectures. As illustrated, the network packets may be transferred in either direction (e.g., by employing ports according to a shortest path route to between a sending module and a destination module. In addition, packet encapsulation and/or tagging may be employed for detecting (and removing) self-forwarded packets. Moreover, selected ports on one or more modules may be configured as uplink ports that facilitate access to external networks, such as depicted by the two uplink ports for module 700m.

Figure 8A:
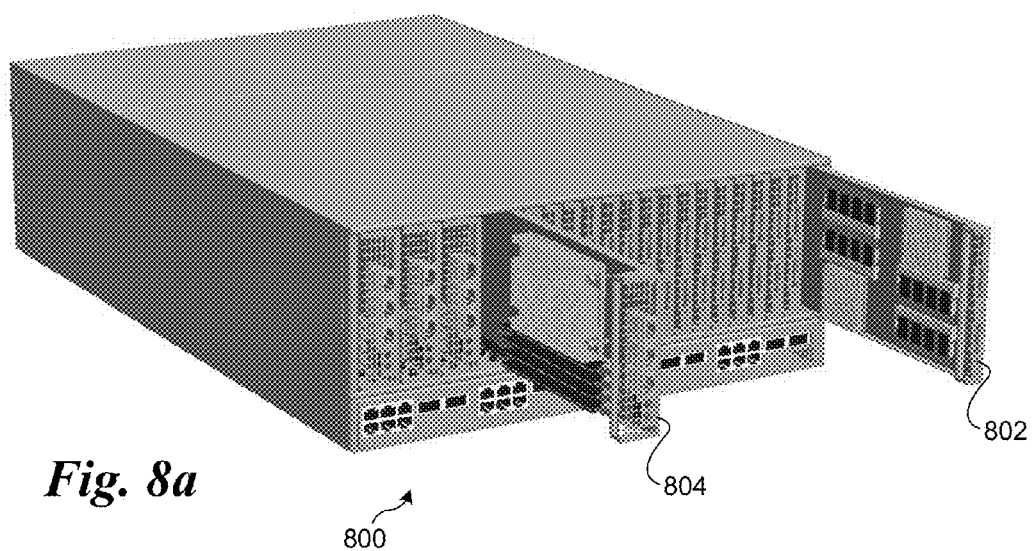
FIGS. 8a and 8b illustrate exemplary micro-server chassis and micro-server module configurations that may be employed to implement aspects of the embodiments disclosed herein.
Figure 8B:
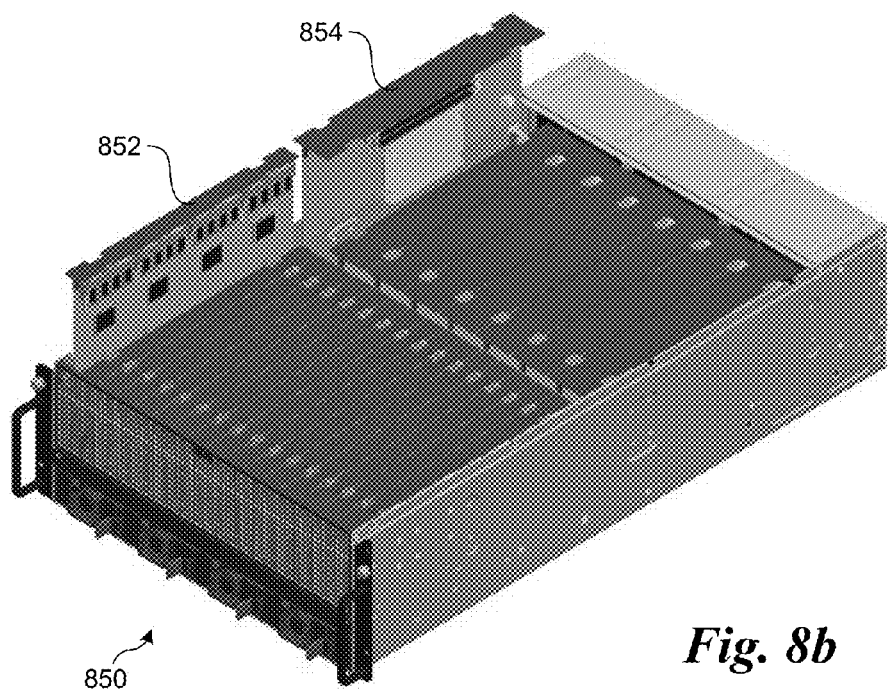

Aspects of the embodiments described above may be implemented to facilitate a clustered server system within a single rack-mountable chassis. For example, two exemplary configurations are illustrated in FIGS. 8a and 8b. In further detail, FIG. 8a depicts a 4U micro-server chassis 800 configured to employ a plurality micro-server modules 802 and server modules 804. When installed in their respective slots, micro-server modules 802 and server modules 804 are connected to a mid-plane that is located approximately mid-depth in chassis 800 (not shown). The mid-plane includes wiring, circuitry, and connectors for facilitating communication between components on the module PCBs (e.g., blades), such as micro-server CPUs and server SoCs. In one embodiment, micro-server modules 802 are similar to micro-server module 400, but employ a rear connector and are configured to be installed horizontally as opposed to being installed vertically from the top. Server module 804 is depicted as employing a larger SoC such as an Intel® Xeon® processor, as compared with a micro-server CPU (e.g., Intel® Atom® processor) employed for micro-server module 802. In one embodiment, the slot width for server module 804 is twice the slot width used for micro-server module 802. In addition to micro-server and server modules, other type of modules and devices may be installed in chassis 800, such as Ethernet switch modules and hot-swap storage devices (the latter of which are installed from the opposite side of chassis 800 depicted in FIG. 8a).

FIG. 8b shows a 4U chassis 850 in which micro-server modules 852 and server modules 854 are installed from the top, whereby the modules' PCB edge connectors are installed in corresponding slots in a baseboard disposed at the bottom of the chassis (not shown). Generally, the baseboard for chassis 850 performs a similar function to the mid-plane in chassis 800. In addition, the server configuration shown in FIG. 8b may further employ a mezzanine board (also not shown) that is configured to facilitate additional communication functions. In the embodiment illustrated in FIG. 8b, the slot width for server modules 854 is twice the slot width for micro-server modules 852. Chassis 850 also is configured to house other types of modules and devices, such as Ethernet switch modules and hot-swap storage devices.

Both the micro-server system configurations shown in FIGS. 8a and 8b facilitate the implementation of a server cluster within a single rack-mountable chassis. Moreover, the user of micro-server CPU subsystems in combination with shared NICs and optional Ethernet switching functionality on the micro-server modules enables a very high density cluster of compute elements to be implemented in a manner that provides enhanced processing capabilities and reduced power compared with conventional rack and blade server architectures. Such systems are well-suited for various types of parallel processing operations, such as Map-Reduce processing. However, they are not limited to parallel processing operation, but may also be employed for a wide variety of processing purposes, such as hosting various cloud-based services.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A micro-server module, comprising:
a printed circuit board (PCB), having a connector and plurality of components mounted thereon or operatively coupled thereto interconnected via wiring on the PCB, the components including,
a plurality of processor sub-systems, each including a processor coupled to memory and including at least one PCIe (Peripheral Component Interconnect Express) interface and configured to be logically implemented as a micro-server; and
a shared Network Interface Controller (NIC), including at least one Ethernet port and a PCIe block including a shared PCIe interface having a first number of lanes,
wherein the PCB includes wiring for facilitating a PCIe link between a PCIe interface for each processor sub-system and the shared PCIe interface on the shared NIC, each of the PCIe links having a number of lanes that is less than the first number of lanes, and wherein, during operation of the micro-server module, the shared NIC is configured to enable each processor sub-system to access the at least one Ethernet port using the PCIe link between that processor sub-system and the shared PCIe interface on the shared NIC,
wherein the shared PCIe block comprises a multi-layer interface including, for each PCIe link, a PCIe physical (PHY) layer, a link layer, and a transaction layer, and wherein the shared PCIe block further includes a multiple lane PCIe PHY layer and a multiplexer that is configured to multiplex signals from the multiple lane PCIe PHY layer and a PCIe PHY layer associated with a PCIe link to a link layer associated with the PCIe link.

2. The micro-server module of claim 1, wherein the total number of lanes for the PCIe links equals the first number of lanes.

3. The micro-server module of claim 1, wherein at least one of the PCIe links employs a single lane.

4. The micro-server module of claim 1, wherein each of the PCIe links employs a single lane.

5. The micro-server module of claim 1, wherein each processor sub-system comprises a System on a Chip.

6. The micro-server module of claim 1, further comprising a Board Management Controller (BMC) coupled to the shared NIC, wherein the shared NIC is configured to provided shared access between the BMC and the plurality of processor sub-systems.

7. The micro-server module of claim 1, wherein the PCB connector comprises a PCIe edge connector.

8. The micro-server module of claim 1, wherein the shared NIC includes at least two Ethernet ports and is further configured to support a distributed switching function.

9. The micro-server module of claim 8, wherein the distributed switching function includes logic for determining whether a packet received at a first Ethernet port is destined for one of the plurality of micro-servers, and if it is not, forwarding the packet out of a second Ethernet port.

10. A micro-server module, comprising:
a printed circuit board (PCB), having a connector and plurality of components mounted thereon or operatively coupled thereto interconnected via wiring on the PCB, the components including, a plurality of processor sub-systems, each including a processor coupled to memory and including at least one PCIe (Peripheral Component Interconnect Express) interface and configured to be logically implemented as a micro-server; and a shared Network Interface Controller (NIC), including at least one Ethernet port and a PCIe block including a shared PCIe interface having a first number of lanes, wherein the PCB includes wiring for facilitating a PCIe link between a PCIe interface for each processor sub-system and the shared PCIe interface on the shared NIC, each of the PCIe links having a number of lanes that is less than the first number of lanes, and wherein, during operation of the micro-server module, the shared NIC is configured to enable each processor sub-system to access the at least one Ethernet port using the PCIe link between that processor sub-system and the shared PCIe interface on the shared NIC, wherein the shared PCIe block comprises a multi-layer interface including, for each PCIe link, a PCIe physical (PHY) layer, a link layer, and a transaction layer, and wherein the multi-layer interface further comprises a PCI link to function mapping layer and a PCIe function layer including a plurality of PCIe functions.

11. The micro-server module of claim 10, wherein the multi-layer interface further comprises shared NIC logic layer configured to share access between PCIe functions and Ethernet functions provided by the shared NIC.

12. A micro-server system comprising:
a chassis having at least one of a baseboard, mid-plane, backplane or mezzanine board mounted therein and including a plurality of slots; and a plurality of micro-server modules, each including a connector configured to mate with a mating connector on one of the baseboard, mid-plane, backplane, or mezzanine board, each micro-server module further including components and circuitry for implementing a plurality of micro-servers, each micro-server including a processor sub-system coupled to a shared Network Interface Controller (NIC) via a PCIe (Peripheral Component Interconnect Express) link, the shared NIC including at least one Ethernet port and a shared PCIe block including a shared PCIe interface having a first number of lanes, each of the PCIe links coupled to the shared PCIe interface and having a number of lanes that is less than the first number of lanes, wherein the shared PCIe block comprises a multi-layer interface including, for each PCIe link, a PCIe physical (PHY) layer, a link layer, and a transaction layer, and wherein the shared PCIe block further includes a multiple lane PCIe PHY layer and a multiplexer that is configured to multiplex signals from the multiple lane PCIe PHY layer and a PCIe PHY layer associated with a PCIe link to a link layer associated with the PCIe link.

13. The micro-server system of claim 12, wherein each of the PCIe links employs a single lane.

14. The micro-server system of claim 12, further comprising at least one Ethernet switch module having a connector configured to mate with a mating connector on one of the baseboard, mid-plane, backplane, or mezzanine board.

15. The micro-server system of claim 12, wherein the shared NIC for at least one of the plurality of micro-server modules includes at least two Ethernet ports and is further configured to support an Ethernet switching function.

16. The micro-server system of claim 12, wherein the shared NIC for at least one of the plurality of micro-server modules includes at least two Ethernet ports and is further configured to support a distributed switching function.

17. The micro-server system of claim 16, wherein the distributed switching function includes logic for determining whether a packet received at a first Ethernet port is destined for one of the plurality of micro-servers on a micro-server module, and if it is not, forwarding the packet out of a second Ethernet port.

18. The micro-server system of claim 16, wherein the system is configured to support at least one of a ring, torus, and 3D torus distributed switching scheme.

19. A shared Network Interface Controller (NIC), comprising:
a PCIe block including a shared PCIe interface having a first number of lanes;
a plurality of Ethernet ports; and
shared NIC logic, configured, upon operation of the shared NIC, to enable shared access to the plurality of Ethernet ports for components linked in communication with the shared NIC via a plurality of PCIe links coupled to the shared PCIe interface, each of the PCIe links having a number of lanes that is less than the first number of lanes, wherein the shared PCIe block comprises a multi-layer interface including, for each PCIe link, a PCIe physical (PHY) layer, a link layer, and a transaction layer, and wherein the shared PCIe block further includes a multiple lane PCIe PHY layer and a multiplexer that is configured to multiplex signals from the multiple lane PCIe PHY layer and a PCIe PHY layer associated with a PCIe link to a link layer associated with the PCIe link.

20. The shared NIC of claim 19, wherein at least one of the PCIe links employs a single lane.

21. The shared NIC of claim 19, wherein each of the PCIe links employs a single lane.

22. The shared NIC of claim 19, further comprising logic configured to implement a Virtual Ethernet Bridge.

23. The shared NIC of claim 19, wherein the shared NIC includes at least two Ethernet ports and is further configured to support a distributed switching function.

24. The shared NIC of claim 23, wherein the distributed switching function includes logic for determining whether a packet received at a first Ethernet port is destined for one of the components, and if it is not, forwarding the packet out of a second Ethernet port.

25. A shared Network Interface Controller (NIC), comprising:
a PCIe block including a shared PCIe interface having a first number of lanes;
a plurality of Ethernet ports; and
shared NIC logic, configured, upon operation of the shared NIC, to enable shared access to the plurality of Ethernet ports for components linked in communication with the shared NIC via a plurality of PCIe links coupled to the shared PCIe interface, each of the PCIe links having a number of lanes that is less than the first number of lanes, wherein the shared PCIe block comprises a multi-layer interface including, for each PCIe link, a PCIe physical (PHY) layer, a link layer, and a transaction layer, and wherein the multi-layer interface further comprises a PCI link to function mapping layer and a PCIe function layer including a plurality of PCIe functions.

26. The shared NIC of claim 25, wherein the multi-layer interface further comprises shared NIC logic layer configured to share access between PCIe functions and Ethernet functions provided by the shared NIC.

* * * * *